(12) United States Patent
Zheng

(10) Patent No.: US 12,254,044 B2
(45) Date of Patent: Mar. 18, 2025

(54) VIDEO PLAYING METHOD, APPARATUS, AND SYSTEM, AND COMPUTER STORAGE MEDIUM

(71) Applicant: Huawei Technologies Co., Ltd., Shenzhen (CN)

(72) Inventor: Luo Zheng, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 17/977,404

(22) Filed: Oct. 31, 2022

(65) Prior Publication Data

US 2023/0045876 A1 Feb. 16, 2023

Related U.S. Application Data

(63) Continuation of application No. PCT/CN2021/085477, filed on Apr. 3, 2021.

(30) Foreign Application Priority Data

Apr. 29, 2020 (CN) .......................... 202010354123.0

(51) Int. Cl.
*G06F 16/74* (2019.01)
*G06F 3/04847* (2022.01)

(52) U.S. Cl.
CPC ........ *G06F 16/745* (2019.01); *G06F 3/04847* (2013.01); *G06F 16/743* (2019.01)

(58) Field of Classification Search
CPC .............................. G06F 16/745; G06F 16/743
See application file for complete search history.

(56) References Cited

U.S. PATENT DOCUMENTS

| 8,891,933 B2* | 11/2014 | Ikeda ...................... H04N 5/765 386/218 |
| 10,356,387 B1 | 7/2019 | Phillips et al. |
| 2001/0028399 A1 | 10/2001 | Conley |
| 2003/0023974 A1* | 1/2003 | Dagtas ............... H04N 21/8126 348/E7.071 |
| 2003/0122949 A1 | 7/2003 | Kanematsu et al. |
| 2006/0028489 A1 | 2/2006 | Uyttendaele et al. |
| 2007/0103558 A1* | 5/2007 | Cai ................... H04N 21/21805 348/E5.022 |
| 2009/0201992 A1* | 8/2009 | Seo ..................... H04N 21/4122 375/E7.088 |
| 2010/0115411 A1* | 5/2010 | Sorokin ................... H04N 7/15 348/148 |
| 2012/0098925 A1* | 4/2012 | Dasher ................. H04N 21/234 348/E7.001 |
| 2013/0039632 A1 | 2/2013 | Feinson |

(Continued)

FOREIGN PATENT DOCUMENTS

| CN | 101630117 A | 1/2010 |
| CN | 106550239 A | 3/2017 |

(Continued)

*Primary Examiner* — James R Sheleheda
(74) *Attorney, Agent, or Firm* — Conley Rose, P.C.

(57) ABSTRACT

In a video playing method, after receiving the rotation fragment, the terminal decodes the rotation fragment, so that surround playing of a video picture can be implemented, and resolution of a played video picture can be the same as resolution of the video picture in the rotation fragment.

20 Claims, 8 Drawing Sheets

(56) References Cited

U.S. PATENT DOCUMENTS

| | | | |
|---|---|---|---|
| 2014/0270684 A1* | 9/2014 | Jayaram | H04N 5/0733 386/224 |
| 2014/0270706 A1* | 9/2014 | Pasko | H04N 21/854 386/278 |
| 2017/0013283 A1* | 1/2017 | Zhang | H04N 21/6547 |
| 2017/0026667 A1 | 1/2017 | Pasko | |
| 2017/0111674 A1 | 4/2017 | Meredith et al. | |
| 2020/0213631 A1* | 7/2020 | Jung | H04N 21/4728 |
| 2021/0152808 A1* | 5/2021 | He | H04N 21/84 |
| 2021/0209777 A1 | 7/2021 | Zhao | |
| 2022/0050869 A1 | 2/2022 | Senokuchi | |
| 2022/0095002 A1* | 3/2022 | Zhou | H04L 65/613 |
| 2023/0045876 A1* | 2/2023 | Zheng | G06F 16/743 |

FOREIGN PATENT DOCUMENTS

| | | | | |
|---|---|---|---|---|
| CN | 107979732 A | 5/2018 | | |
| CN | 108876926 A | 11/2018 | | |
| CN | 109257611 A | 1/2019 | | |
| CN | 109996110 A | 7/2019 | | |
| CN | 110719425 A | 1/2020 | | |
| EP | 3621309 A1 | 3/2020 | | |
| EP | 3734980 A1 | 11/2020 | | |
| JP | 2015186148 A | 10/2015 | | |
| JP | 2020107976 A | 7/2020 | | |
| KR | 101399951 B1 * | 6/2014 | | H04N 21/234 |
| KR | 101530826 B1 * | 6/2015 | | H04N 21/2387 |
| KR | 20150061459 A * | 6/2015 | | H04N 21/2343 |
| WO | 02087218 A2 | 10/2002 | | |
| WO | 2019004498 A1 | 1/2019 | | |

\* cited by examiner

| Encapsulation header 1 | Data field 1 (GOP) | Encapsulation header 2 | Data field 2 (GOP) | ... | Encapsulation header n | Data field n (GOP) |

FIG. 2

VIDEO PLAYING METHOD, APPARATUS, AND SYSTEM, AND COMPUTER STORAGE MEDIUM

CROSS-REFERENCE TO RELATED APPLICATIONS

This is a continuation of Int'l Patent App. No. PCT/CN2021/085477 filed on Apr. 3, 2021, which claims priority to Chinese Patent App. No. 202010354123.0 filed on Apr. 29, 2020, both of which are incorporated by reference.

FIELD

This disclosure relates to the field of video processing technologies, and in particular, to a video playing method, apparatus, and system, and a computer storage medium.

BACKGROUND

With rapid development of Internet technologies, a user starts to seek better video viewing experience. Therefore, there is a requirement for surround viewing around a target object. Especially in a sports game, a concert, or another scenario with a specific focus, there is a higher requirement for surround viewing. To meet a requirement of the user for surround viewing, surround playing needs to be implemented on a terminal.

To implement surround playing, during front-end shooting, a plurality of cameras distributed at specific locations need to collect video pictures at different angles in a same focal area. In addition, a camera synchronization technology is used to ensure that the plurality of cameras collect pictures at a same moment and at a same frequency. Then, the plurality of cameras each send a collected video stream to a video processing platform, and the video processing platform processes a plurality of video streams, to further implement surround playing of the focal area on the terminal.

In a related technology, a serving end usually stitches, into one video frame, video frames collected at a same moment in the plurality of video streams. For example, during front-end shooting, 16 cameras are used to collect video pictures at different angles in a same focal area. The serving end adjusts resolution of a video frame in each of 16 received video streams to 960×540. Then, 16 video frames collected at a same moment in the 16 video streams are combined, in an equal proportion of 4×4, into one video frame whose resolution is 3840×2160 (namely, 4K), to obtain one video stream. The serving end sends the video stream to the terminal. After decoding the video stream, the terminal selects, for playing, 1/16 of each frame of video picture (a video picture collected by one camera) in the video stream based on a specified shooting location for viewing.

However, in a video playing method in a related technology, because resolution of a picture played by the terminal is inversely proportional to a quantity of cameras used for front-end shooting, the quantity of cameras used for front-end shooting is limited. Consequently, there is a high application limitation.

SUMMARY

This disclosure provides a video playing method, apparatus, and system, and a computer storage medium, to resolve a problem that there is a high application limitation on video playing in a related technology.

According to a first aspect, a video playing method is provided. The method includes: An upper-layer device receives a surround playing request sent by a terminal. The surround playing request includes rotation shooting location information, and the rotation shooting location information is used to indicate a rotation range. The upper-layer device determines playing time information based on the surround playing request. The upper-layer device generates a rotation fragment based on the rotation shooting location information and the playing time information. The rotation fragment includes groups of pictures (GOP) corresponding to a plurality of shooting locations in the rotation range, and the GOP includes one or more frames of video pictures. The upper-layer device sends the rotation fragment to the terminal.

Optionally, the rotation shooting location information includes one or more of a start shooting location identifier, an end shooting location identifier, a rotation direction, or a rotation angle. Optionally, the playing time information includes one or more of a playing start moment, a playing end moment, or surround playing duration. Alternatively, the playing time information includes a target playing moment.

Because the rotation fragment includes the GOPs corresponding to the plurality of shooting locations in the rotation range indicated by the rotation shooting location information, after the terminal receives the rotation fragment, the terminal decodes the rotation fragment, so that surround playing of a video picture can be implemented, and resolution of a played video picture can be the same as resolution of the video picture in the rotation fragment. Therefore, the video playing method provided is not limited by a quantity of cameras used for front-end shooting, and is widely applied.

In a possible implementation, the playing time information includes a playing start moment and a playing end moment. An implementation process in which the upper-layer device generates the rotation fragment based on the rotation shooting location information and the playing time information includes: The upper-layer device obtains m video fragments that correspond to each of the plurality of shooting locations and that are obtained from the playing start moment to the playing end moment, where m is a positive integer. The upper-layer device extracts, based on the playing time information, one or more GOPs from the m video fragments corresponding to each shooting location. The upper-layer device assembles extracted GOPs, to obtain the rotation fragment.

Optionally, an implementation process in which the upper-layer device extracts, based on the playing time information, the one or more GOPs from the m video fragments corresponding to each shooting location includes: The upper-layer device determines, based on surround playing duration and a quantity of the plurality of shooting locations, a quantity of extracted GOPs and a GOP extraction moment that correspond to each shooting location. The surround playing duration is equal to a difference between the playing end moment and the playing start moment. The upper-layer device extracts, based on the quantity of extracted GOPs and the GOP extraction moment that correspond to each shooting location, the GOP from the m video fragments corresponding to each shooting location.

In this implementation, the rotation fragment generated by the upper-layer device is a dynamic rotation fragment. The upper-layer device may generate the dynamic rotation fragment in a video playing process of the terminal, to implement dynamic surround playing on the terminal. That the terminal performs dynamic surround playing of video content means that the terminal plays video pictures that are consecutive in a time sequence. In other words, a current frame of video picture played by the terminal and a previous frame of picture played by the terminal are two frames of pictures that are continuously collected in a time sequence.

In another possible implementation, the playing time information includes a target playing moment. An implementation process in which the upper-layer device generates the rotation fragment based on the rotation shooting location information and the playing time information includes: The upper-layer device obtains a target video fragment corresponding to each of the plurality of shooting locations. A time period corresponding to the target video fragment includes the target playing moment. The upper-layer device extracts, from the target video fragment corresponding to each shooting location, one GOP corresponding to the target playing moment. The GOP includes one frame of video picture. The upper-layer device assembles extracted GOPs, to obtain the rotation fragment.

In this implementation, the rotation fragment generated by the upper-layer device is a static rotation fragment. The upper-layer device may generate the static rotation fragment when playing of a video on the terminal is paused, to implement static surround playing on the terminal. That the terminal performs static surround playing of video content means that the terminal performs surround playing of video pictures collected by a plurality of cameras at a same moment.

Optionally, the upper-layer device determines a start shooting location, an end shooting location, and a rotation direction based on the rotation shooting location information. The upper-layer device determines the plurality of shooting locations from shooting locations from the start shooting location to the end shooting location in the rotation direction. In the foregoing two implementations, an implementation process in which the upper-layer device assembles the extracted GOPs, to obtain the rotation fragment includes: The upper-layer device sequentially assembles the extracted GOPs in the rotation direction, to obtain the rotation fragment.

Optionally, an implementation process in which the upper-layer device determines the playing time information based on the surround playing request includes: The upper-layer device determines the playing start moment and the playing end moment based on a moment at which the surround playing request is received and a preset policy. The preset policy includes preset surround playing duration. Alternatively, the surround playing request includes the playing start moment and the playing end moment, and an implementation process in which the upper-layer device determines the playing time information based on the surround playing request includes: The upper-layer device identifies the playing start moment and the playing end moment from the surround playing request. Alternatively, the surround playing request includes the playing start moment, and an implementation process in which the upper-layer device determines the playing time information based on the surround playing request includes: The upper-layer device determines the playing end moment based on the playing start moment and preset surround playing duration. Alternatively, the surround playing request includes the surround playing duration, and an implementation process in which the upper-layer device determines the playing time information based on the surround playing request includes: The upper-layer device determines the playing start moment and the playing end moment based on a moment at which the surround playing request is received and the surround playing duration. Alternatively, the surround playing request includes the playing start moment and the surround playing duration, and an implementation process in which the upper-layer device determines the playing time information based on the surround playing request includes: The upper-layer device determines the playing end moment based on the playing start moment and the surround playing duration.

Optionally, the GOP is encoded in an encapsulation manner for independent transmission, so that each GOP can be used as a separate fragment for independent transmission and use.

According to a second aspect, a video playing method is provided. The method includes: When a terminal receives a rotation instruction, the terminal sends, to an upper-layer device, a surround playing request generated based on the rotation instruction. The surround playing request includes rotation shooting location information, and the rotation shooting location information is used to indicate a rotation range. The terminal receives a rotation fragment sent by the upper-layer device. The rotation fragment includes GOPs corresponding to a plurality of shooting locations in the rotation range, and the GOP includes one or more frames of video pictures. The terminal decodes and plays the rotation fragment.

Optionally, when the terminal detects a sliding operation in a video playing interface, the terminal determines that the rotation instruction is received. The terminal determines the rotation shooting location information based on sliding information of the sliding operation. The sliding information includes one or more of a sliding start location, a sliding length, a sliding direction, or a sliding angle. The terminal generates the surround playing request based on the rotation shooting location information.

Optionally, when the terminal receives a target remote control instruction sent by a remote control device, the terminal determines that the rotation instruction is received. The target remote control instruction includes remote control button information, and the remote control button information includes a button identifier and/or a quantity of times of pressing a button. The terminal determines the rotation shooting location information based on the remote control button information. The terminal generates the surround playing request based on the rotation shooting location information.

The terminal does not need to change playing logic, and only needs to send the surround playing request to the upper-layer device after receiving the rotation instruction, and then decodes the rotation fragment, so that surround playing of a video picture can be implemented, and resolution of a played video picture can be the same as resolution of the video picture in the rotation fragment. Therefore, the video playing method provided is not limited by a quantity of cameras used for front-end shooting, and is widely applied.

According to a third aspect, a video playing apparatus is provided. The apparatus includes a plurality of function modules, and the plurality of function modules interact with each other to implement the method in the first aspect and the implementations of the first aspect. The plurality of function modules may be implemented based on software, hardware, or a combination of software and hardware, and the plurality of function modules may be randomly combined or divided based on specific implementation.

According to a fourth aspect, a video playing apparatus is provided. The apparatus includes a plurality of function modules, and the plurality of function modules interact with each other to implement the method in the second aspect and the implementations of the second aspect. The plurality of function modules may be implemented based on software, hardware, or a combination of software and hardware, and the plurality of function modules may be randomly combined or divided based on specific implementation.

According to a fifth aspect, a video playing system is provided. The system includes an upper-layer device and a terminal, the upper-layer device includes the video playing apparatus according to the third aspect, and the terminal includes the video playing apparatus according to the fourth aspect.

According to a sixth aspect, a video playing apparatus is provided, including a processor and a memory.

The memory is configured to store a computer program, where the computer program includes program instructions.

The processor is configured to invoke the computer program, to implement the video playing method according to any implementation of the first aspect, or implement the video playing method according to any implementation of the second aspect.

According to a seventh aspect, a computer storage medium is provided. The computer storage medium stores instructions, and when the instructions are executed by a processor of a computer device, the video playing method according to either the first aspect or the second aspect is implemented.

According to an eighth aspect, a chip is provided. The chip includes a programmable logic circuit and/or program instructions. When the chip runs, the method according to any one of the first aspect and the implementations of the first aspect or the second aspect and the implementations of the second aspect is implemented.

Beneficial effects brought by the technical solutions provided include at least the following.

The upper-layer device determines the playing time information based on the surround playing request sent by the terminal, and then generates the rotation fragment based on the playing time information and the rotation shooting location information in the surround playing request. Because the rotation fragment includes the GOPs corresponding to the plurality of shooting locations in the rotation range indicated by the rotation shooting location information, after the terminal receives the rotation fragment, the terminal decodes the rotation fragment, so that surround playing of the video picture can be implemented, and the resolution of the played video picture can be the same as the resolution of the video picture in the rotation fragment. Therefore, the video playing method provided is not limited by the quantity of cameras used for front-end shooting, and is widely applied. In addition, the upper-layer device may be a video distribution server or a network device, to reduce a requirement for processing performance of a video processing server. There is high implementation reliability.

BRIEF DESCRIPTION OF THE DRAWINGS

FIG. 2 is a schematic diagram of a structure of a video fragment according to an embodiment.

DETAILED DESCRIPTION

To make the objectives, technical solutions, and advantages of this disclosure clearer, the following further describes the implementations in detail with reference to the accompanying drawings.

Figure 1:
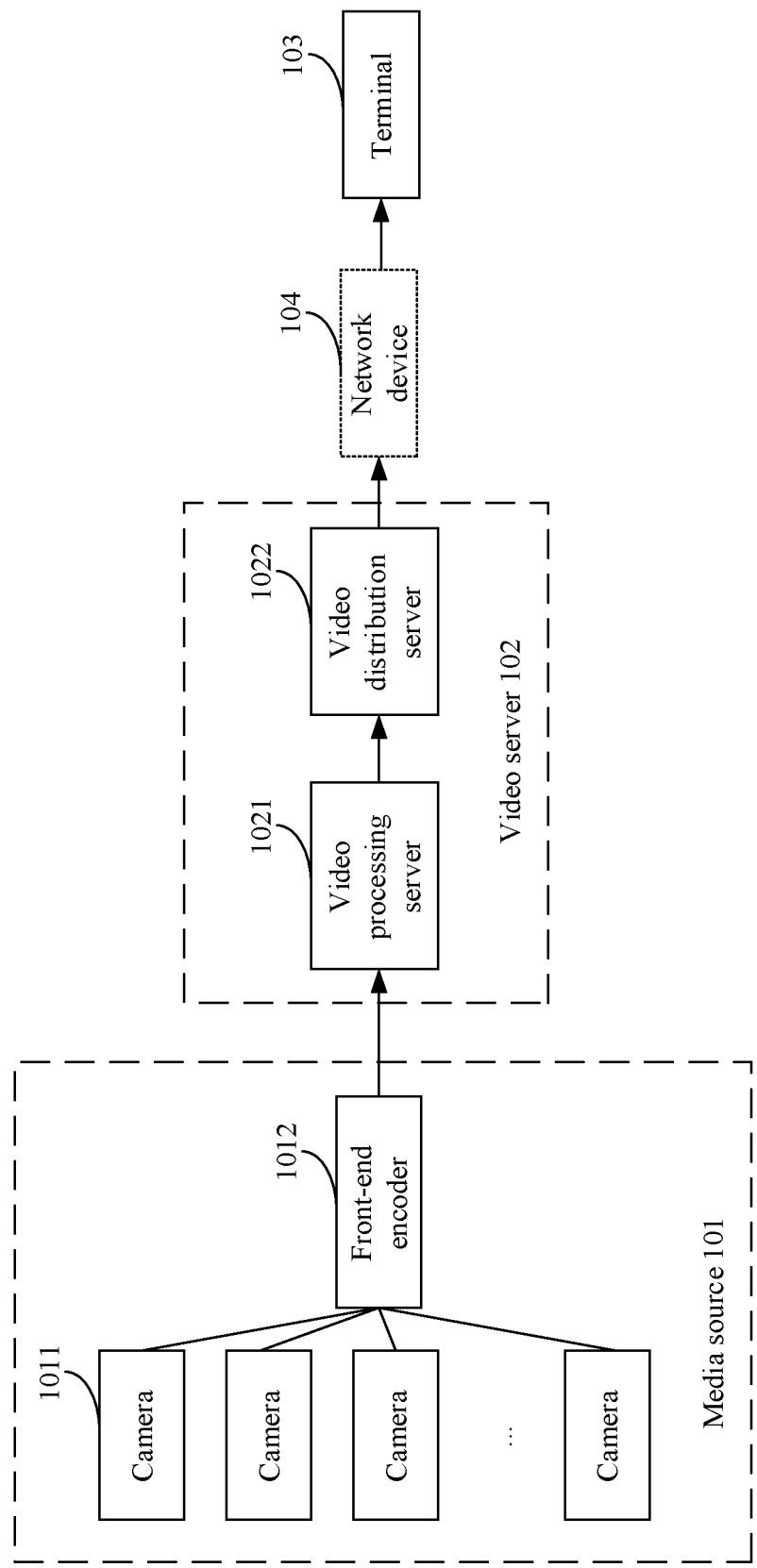
FIG. 1 is a schematic diagram of a structure of a video playing system according to an embodiment.

FIG. 1 is a schematic diagram of a structure of a video playing system according to an embodiment. As shown in FIG. 1, the system includes a media source 101, a video server 102, and a terminal 103.

The media source 101 is configured to provide a plurality of video streams. Refer to FIG. 1. The media source 101 includes a plurality of cameras 1011 and a front-end encoder 1012. The camera 1011 is connected to the front-end encoder 1012. Each camera 1011 is configured to: collect one video stream, and transmit the collected video stream to the front-end encoder 1012. The front-end encoder 1012 is configured to: encode video streams collected by the plurality of cameras 1011, and send the encoded video streams to the video server 102. In this embodiment, the plurality of cameras 1011 are configured to: collect video pictures at different angles in a same focal area. The plurality of cameras 1011 collect pictures at a same moment and a same frequency. Optionally, the plurality of cameras 1011 may implement synchronous shooting by using a camera synchronization technology. A quantity of cameras in the figure is merely used as an example for description, and is not used as a limitation on the video playing system provided in this embodiment. An annular arrangement manner, a sectorial arrangement manner, or the like may be used for the plurality of cameras. A camera arrangement manner is not limited in this embodiment.

The video server 102 is configured to: process, by using an over-the-top (OTT) technology, the video stream sent by the media source 101, and distribute the processed video stream to the terminal through a content delivery network (CDN). The CDN is an intelligent virtual network built based on an existing network, and relies on edge servers deployed at various locations. Optionally, referring to FIG. 1, the video server 102 includes a video processing server 1021 and a video distribution server 1022. The video processing server 1021 is configured to: process the video stream by using the OTT technology, and send the processed video stream to the video distribution server 1022. The video distribution server 1022 is configured to distribute the video stream to the terminal. The video processing server 1021 may also be referred to as a video processing platform. The video processing server 1021 may be one server, or a server cluster including several servers, or a cloud computing service center. The video distribution server 1022 is an edge server.

The terminal 103, namely, a video playing end, is configured to decode and play the video stream sent by the video server 102. Optionally, the terminal 103 can change a playing angle in one or more of control manners such as a touch control manner, a voice control manner, a gesture control manner, or a remote control manner. A control manner for triggering the terminal to change the playing angle is not limited in this embodiment. For example, the terminal 103 may be a device that can change the playing angle in the touch control manner or the voice control manner, for example, a mobile phone, a tablet computer, or an intelligent wearable device. Alternatively, the terminal 103 may be a device that can change the playing angle through control performed by using a remote control, for example, a set-top box (STB).

In this embodiment, a video stream is transmitted between the video server 102 and the terminal 103 based on Hyper-text Transfer Protocol (HTTP). Optionally, after obtaining the plurality of video streams, the front-end encoder 1012 on a side of the media source 101 or the video processing server 1021 on a side of the video server 102 re-encodes (which may also be referred to as transcoding) each video stream, to obtain a GOP, and generates a video fragment based on the GOP, to transmit the GOP. A plurality of GOPs are usually encapsulated in the video fragment, and each GOP includes one or more frames of video pictures. The GOP includes a group of video pictures that are consecutive in time. A time stamp of a GOP obtained by re-encoding a video stream corresponds to a moment at which a camera collects a video picture in the GOP. For example, the time stamp of the GOP may be set to a moment at which a last frame of video picture in the GOP is collected. For another example, when the GOP includes a plurality of frames of video pictures, the GOP corresponds to a start time stamp and an end time stamp, the start time stamp is a moment at which a first frame of video picture in the GOP is collected, and the end time stamp is a moment at which a last frame of video picture in the GOP is collected.

Optionally, a time length of the GOP is less than or equal to 100 milliseconds. A time parameter of the GOP may be set by an administrator. In a case of a fixed time length, a quantity of frames of video pictures included in each GOP is positively related to a shooting frame rate of a camera. In other words, a higher shooting frame rate of the camera indicates a larger quantity of frames of the video pictures included in each GOP. For example, the GOP may include two frames of video pictures (a corresponding quantity of frames per second (FPS) is 25), three frames of video pictures (corresponding to 30 FPS), five frames of video pictures (corresponding to 50 FPS), or six frames of video pictures (corresponding to 60 FPS). Certainly, the GOP may alternatively include only one frame of video picture or include more frames of video pictures. This is not limited in this embodiment.

In this embodiment, the GOP in the video fragment is encoded in an encapsulation manner for independent transmission, so that each GOP can be used as a separate chunk for independent transmission and use. For example, the video fragment may be encapsulated in a fragmented mp4 (fmp4) format. The fmp4 format is a streaming media format defined in an MPEG-4 standard provided by Moving Picture Experts Group (MPEG). FIG. 2 is a schematic diagram of a structure of a video fragment according to an embodiment.

As shown in FIG. 2, the video fragment includes n encapsulation headers and n data fields (mdat), and each data field mdat is used to carry data of one GOP. In other words, n GOPs are encapsulated in the video fragment, and n is an integer greater than 1. Each encapsulation header includes a moof field. An encapsulation manner of the video fragment may also be referred to as a multi-moof header encapsulation manner. Optionally, the encapsulation header may further include an styp field and an sidx field.

The video processing server 1021 on the side of the video server 102 generates a media content index (which may also be referred to as an OTT index) based on externally specified data. The media content index is used to describe information about each video stream, and the media content index is essentially a file that describes the information about the video stream. The information about the video stream includes address information of the video stream, time information of the video stream, or the like. The address information of the video stream is used to indicate an obtaining address of the video stream. For example, the address information of the video stream may be a uniform resource locator (URL) address corresponding to the video stream. The time information of the video stream is used to indicate a start moment and an end moment of each video fragment in the video stream. Optionally, the media content index may further include shooting location information. The shooting location information includes a quantity of shooting locations (namely, a quantity of cameras on the side of the media source) and a shooting location angle corresponding to each video stream. The shooting location angle corresponding to the video stream is a shooting location angle corresponding to a camera.

Figure 3:
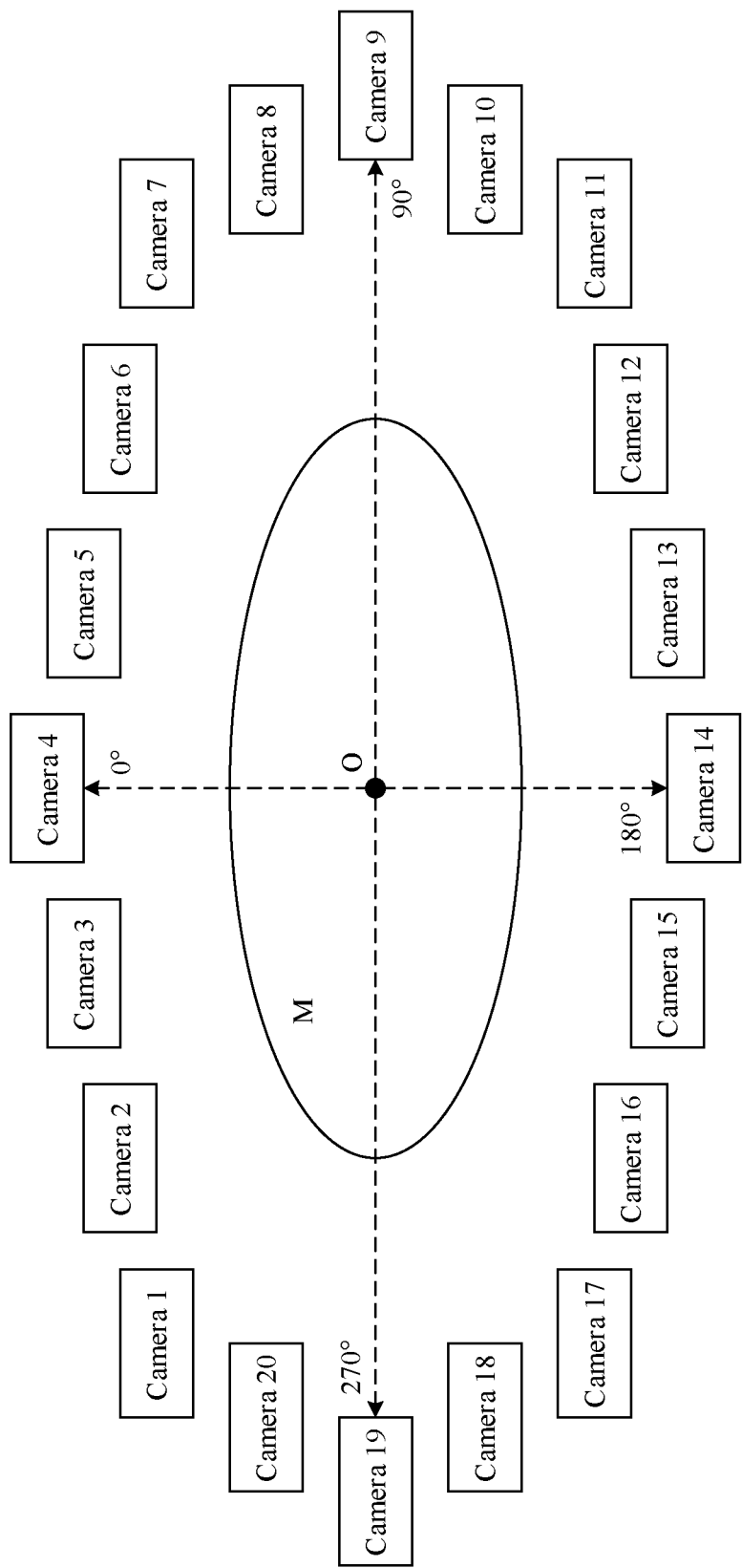
FIG. 3 is a schematic diagram of a camera distribution scenario on a side of a media source according to an embodiment.

For example, FIG. 3 is a schematic diagram of a camera distribution scenario on a side of a media source according to an embodiment. As shown in FIG. 3, in this scenario, 20 cameras are included, and are respectively denoted as a camera 1 to a camera 20. An annular arrangement manner is used for the 20 cameras, the 20 cameras are used to shoot a same focal area M, and a focal point of shooting the focal area M is a point O. A shooting location angle corresponding to one camera may be set to 0, and shooting location angles corresponding to the other cameras are correspondingly calculated. For example, a shooting location angle corresponding to a camera 4 may be set to 0°, and shooting location angles corresponding to the other cameras are separately calculated. In this case, a shooting location angle corresponding to a camera 9 is 90°, a shooting location angle corresponding to a camera 14 is 180°, and a shooting location angle corresponding to a camera 19 is 270°. The administrator may enter a quantity of cameras and a shooting location angle corresponding to each camera into the video processing server, so that the video processing server generates the media content index.

Optionally, the media content index in this embodiment may be an m3u8 file (which may be referred to as an HLS index) or a media presentation description (MPD) file (which may be referred to as a DASH index). The m3u8 file is an m3u file in a UTF-8 encoding format.

A process in which the terminal obtains video content in the video server includes: The terminal first downloads the media content index from the video server, and parses the media content index, to obtain information about the video stream. The terminal selects a video stream that needs to be played currently, extracts a URL address of the video stream from the media content index, and then sends a media content request to the video server based on the URL address of the video stream. After receiving the media content request, the video server sends the corresponding video stream to the terminal.

Optionally, referring to FIG. 1, the video playing system may further include a network device 104, and the video server 102 and the terminal 103 are connected by using the network device 104. The network device 104 may be a gateway or another intermediate device. Certainly, the video server 102 and the terminal 103 may alternatively be directly connected to each other. This is not limited in this embodiment.

Figure 4:
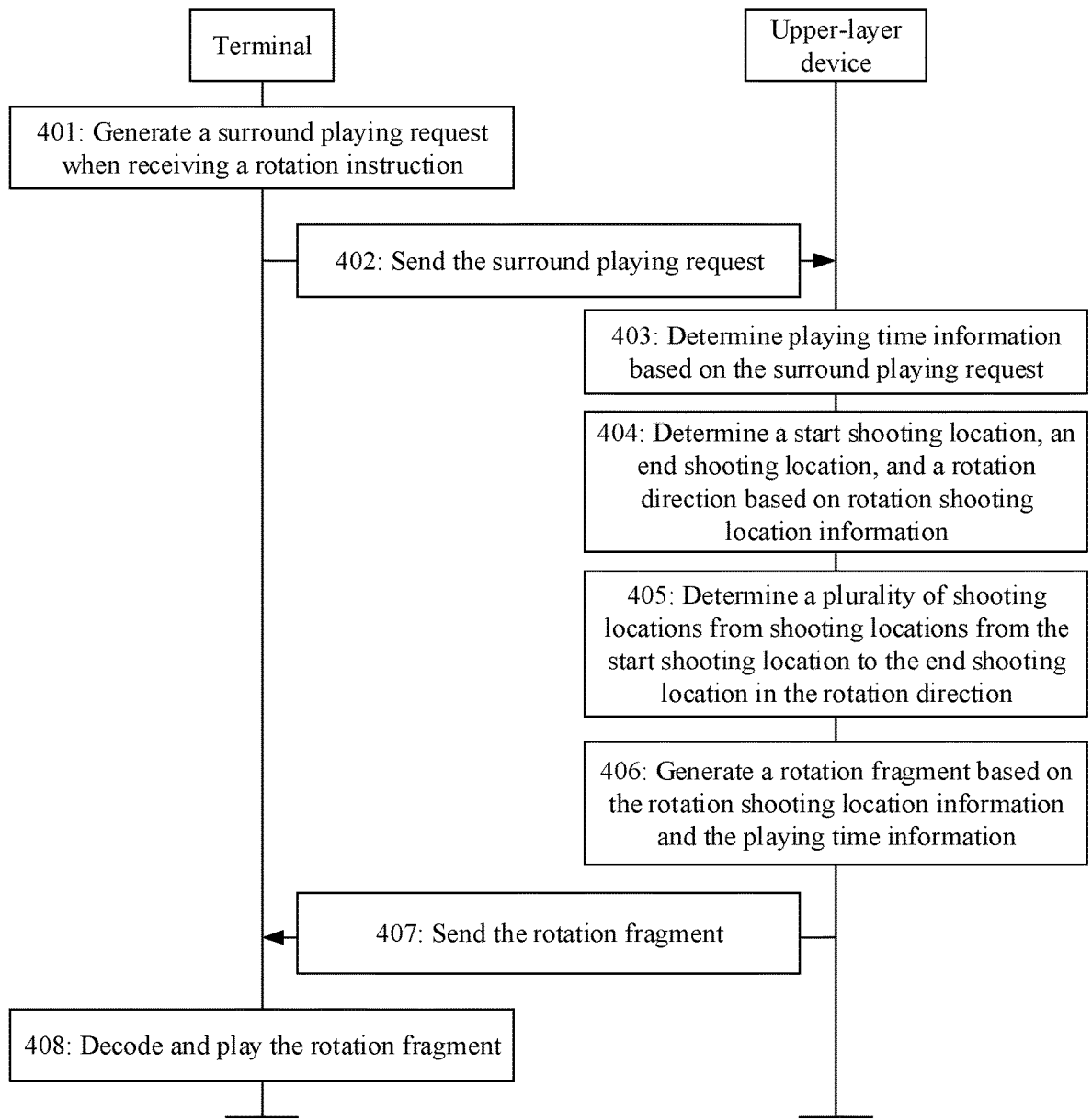
FIG. 4 is a schematic flowchart of a video playing method according to an embodiment.

FIG. 4 is a schematic flowchart of a video playing method according to an embodiment. The method may be applied to the video playing system shown in FIG. 1. As shown in FIG. 4, the method includes the following steps.

Step 401: When a terminal receives a rotation instruction, the terminal generates a surround playing request.

The surround playing request includes rotation shooting location information, and the rotation shooting location information is used to indicate a rotation range. Optionally, when a media content index obtained by the terminal includes shooting location information, after the terminal receives the rotation instruction, the terminal may determine a start shooting location, an end shooting location, and a rotation direction based on the rotation instruction and the location information. In this case, the rotation shooting location information may include a start shooting location identifier, an end shooting location identifier, and the rotation direction. Alternatively, after receiving the rotation instruction, the terminal may determine a rotation angle based on the rotation instruction. In this case, the rotation shooting location information may include the rotation angle.

Optionally, when the terminal receives the rotation instruction in a video playing state, the surround playing request generated by the terminal is used to request to perform dynamic surround playing of video content. In this case, the surround playing request is further used to determine a playing start moment and a playing end moment. Optionally, the surround playing request further includes playing time information, and the playing time information includes one or more of the playing start moment, the playing end moment, or surround playing duration.

Optionally, when the terminal receives the rotation instruction in a state in which playing of a video is paused, the surround playing request generated by the terminal is used to request to perform static surround playing of video content. In this case, the surround playing request is further used to determine a target playing moment. Optionally, the surround playing request includes the target playing moment, and the target playing moment may be a video pausing moment. Static surround playing of the video content is to perform surround playing of video pictures that correspond to the target playing moment and that are provided by a plurality of shooting locations.

In a possible implementation, when the terminal detects a sliding operation in a video playing interface, the terminal determines that the rotation instruction is received. The terminal determines the rotation shooting location information based on sliding information of the sliding operation. The sliding information includes one or more of a sliding start location, a sliding length, a sliding direction, or a sliding angle. Then, the terminal generates the surround playing request based on the rotation shooting location information. The sliding start location, the sliding length, and the sliding direction may be used to determine the start shooting location, the end shooting location, and the rotation direction. The sliding angle may be used to determine the rotation angle.

Optionally, the sliding start location corresponds to the start shooting location, the sliding direction corresponds to the rotation direction, and the sliding length is used to define a quantity of to-be-switched shooting locations. That the sliding direction is the left indicates counterclockwise rotation, and that the sliding direction is the right indicates clockwise rotation. Each time the sliding length reaches a unit length, it indicates to switch one shooting location. For example, the unit length may be set to one centimeter. When the sliding length reaches three centimeters, it indicates to switch three shooting locations. Sliding sensitivity is negatively related to a specified value of the unit length. In other words, a smaller specified value of the unit length indicates higher sliding sensitivity. The sliding sensitivity may be set based on an actual requirement.

For example, it is assumed that the sliding direction is the right, the sliding length is 5 centimeters, and the unit length is one centimeter. In this case, it indicates to switch five shooting locations through clockwise rotation. Refer to FIG. 3. It is assumed that the start shooting location corresponding to the sliding start location is a camera 9. In this case, the terminal determines that the rotation direction is a clockwise direction, and the end shooting location is a camera 14.

Optionally, when the surround playing request is used to request to perform dynamic surround playing of the video content, the surround playing duration may be further defined based on sliding duration. For example, the surround playing duration may be equal to the sliding duration.

Optionally, the sliding angle is used to determine the rotation angle. It may be set that the rotation angle and the sliding angle meet a specific relationship. For example, the rotation angle is equal to the sliding angle, or the rotation angle equal to two times of the sliding angle. When the rotation shooting location information includes the rotation angle, a positive value and a negative value of the rotation angle may be further used to indicate the rotation direction. For example, if the rotation angle has a positive value, it indicates clockwise rotation, or if the rotation angle has a negative value, it indicates counterclockwise rotation.

In another possible implementation, when the terminal receives a target remote control instruction sent by a remote control device, the terminal determines that the rotation instruction is received. The target remote control instruction includes remote control button information, and the remote control button information includes a button identifier and/or a quantity of times of pressing a button. The terminal determines the rotation shooting location information based on the remote control button information. Then, the terminal generates the surround playing request based on the rotation shooting location information. The button identifier may be used to determine the rotation direction. The quantity of times of pressing a button may be used to determine a quantity of to-be-switched shooting locations.

Optionally, the rotation direction is determined based on the button identifier. For example, when the remote control button information includes an identifier of a left button, it indicates that the rotation direction is a counterclockwise direction, and when the remote control button information includes an identifier of a right button, it indicates that the rotation direction is a clockwise direction. Certainly, another button may be disposed on the remote control device, to control the rotation direction. This is not limited in this embodiment. The quantity of times of pressing a button is used to define the quantity of to-be-switched shooting locations. For example, if the quantity of times of pressing a button is 1, it indicates to switch one shooting location.

For example, it is assumed that the remote control button information includes the identifier of the left button, and the quantity of times of pressing a button is 3. In this case, it indicates to switch three shooting locations through counterclockwise rotation. Refer to FIG. 3. It is assumed that the start shooting location is the camera 9. Therefore, the terminal determines, based on the button identifier, that the rotation direction is a counterclockwise direction, determines, based on the quantity of times of pressing a button, that the quantity of to-be-switched shooting locations is 3, and further determines that the end shooting location is a camera 6.

Optionally, when the surround playing request is used to request to perform dynamic surround playing of the video content, the surround playing duration may be further defined based on button pressing duration. For example, the surround playing duration may be equal to the button pressing duration.

Step 402: The terminal sends the surround playing request to an upper-layer device.

The upper-layer device is an upstream device of the terminal. Optionally, the upper-layer device may be a video server (which may be specifically a video distribution server) or a network device in the video playing system shown in FIG. 1.

Step 403: The upper-layer device determines the playing time information based on the surround playing request.

In an optional embodiment, the surround playing request is used to request to perform dynamic surround playing of the video content, and the playing time information includes the playing start moment and the playing end moment. There are five implementations in which the upper-layer device determines the playing time information based on the surround playing request:

In a first implementation, an implementation process of step 403 includes: The upper-layer device determines the playing start moment and the playing end moment based on a moment at which the surround playing request is received and a preset policy. The preset policy includes preset surround playing duration.

Optionally, it is defined in the preset policy that a video playing moment at which the upper-layer device receives the surround playing request is used as the playing start moment, and duration of an interval between the playing end moment and the playing start moment is equal to the preset surround playing duration. For example, when the video playing moment at which the upper-layer device receives the surround playing request is 00:19:35, and the preset surround playing duration is two seconds. In this case, the upper-layer device determines that the playing start moment is 00:19:35, and the playing end moment is 00:19:37. Alternatively, it is alternatively defined in the preset policy that a video playing moment that is separated by specific duration from a receiving moment (corresponding to a video playing moment) of the surround playing request is used as the playing start moment, and the playing start moment may be before the receiving moment of the surround playing request in a time sequence, or the playing start moment may be after the receiving moment of the surround playing request in a time sequence. For example, the receiving moment of the surround playing request is 00:19:35, and the playing start moment may be 00:19:34, or the playing start moment may be 00:19:36.

In a second implementation, the surround playing request includes the playing start moment and the playing end moment. An implementation process of step 403 includes: The upper-layer device identifies the playing start moment and the playing end moment from the surround playing request.

Optionally, a specified field of the surround playing request is predefined or preconfigured to carry the playing start moment and the playing end moment. That the specified field of the surround playing request is predefined may be that the specified field of the surround playing request is defined in a standard or a protocol. That the specified field of the surround playing request is preconfigured may be that the upper-layer device and the terminal pre-negotiate the specified field of the surround playing request. After receiving the surround playing request, the upper-layer device may identify the playing start moment and the playing end moment from the specified field.

For example, the specified field of the surround playing request carries two moments, and the two moments are respectively 00:19:35 and 00:19:37. In this case, the upper-layer device determines that the playing start moment is 00:19:35, and the playing end moment is 00:19:37.

In a third implementation, the surround playing request includes the playing start moment. An implementation process of step 403 includes: The upper-layer device determines the playing end moment based on the playing start moment and preset surround playing duration.

For example, the playing start moment carried in the surround playing request is 00:19:35, and the preset surround playing duration is two seconds. In this case, the upper-layer device determines that the playing end moment is 00:19:37.

In a fourth implementation, the surround playing request includes the surround playing duration. An implementation process of step 403 includes: The upper-layer device determines the playing start moment and the playing end moment based on a moment at which the surround playing request is received and the surround playing duration.

Optionally, for a manner in which the upper-layer device determines the playing start moment and the playing end moment, refer to the first implementation. Details are not described herein again in this embodiment.

In a fifth implementation, the surround playing request includes the playing start moment and the surround playing duration. An implementation process of step 403 includes: The upper-layer device determines the playing end moment based on the playing start moment and the surround playing duration.

For example, the playing start moment carried in the surround playing request is 00:19:35, and the surround playing duration is two seconds. In this case, the upper-layer device determines that the playing end moment is 00:19:37.

In another optional embodiment, the surround playing request is used to request to perform static surround playing of the video content, and the playing time information includes the target playing moment. Optionally, the surround playing request includes the target playing moment. Alternatively, the surround playing request does not include the target playing moment, and the upper-layer device determines the target playing moment based on a moment at which the surround playing request is received. For a manner in which the upper-layer device determines the target playing moment, refer to a manner in which the upper-layer device determines the playing start moment in the first implementation. Details are not described herein again in this embodiment.

Step 404: The upper-layer device determines the start shooting location, the end shooting location, and the rotation direction based on the rotation shooting location information.

Optionally, when the rotation shooting location information includes the start shooting location identifier, the end shooting location identifier, and the rotation direction, after the upper-layer device receives the surround playing request, the upper-layer device may determine the start shooting location, the end shooting location, and the rotation direction based on content in the rotation shooting location information.

Optionally, when the rotation shooting location information includes the rotation angle, after the upper-layer device receives the surround playing request, the upper-layer device determines the end shooting location and the rotation direction based on the start shooting location and the rotation angle. For example, referring to FIG. 3, it is assumed that the start shooting location determined by the upper-layer device is the camera 9, and the rotation angle carried in the surround playing request is −90°. In this case, the upper-layer device determines that the rotation direction is a counterclockwise direction, and the end shooting location is the camera 4.

Step 405: The upper-layer device determines the plurality of shooting locations from shooting locations from the start shooting location to the end shooting location in the rotation direction.

Optionally, the plurality of shooting locations determined by the upper-layer device may include all shooting locations from the start shooting location to the end shooting location in the rotation direction. For example, referring to FIG. 3, it is assumed that the start shooting location is the camera 9, the end shooting location is the camera 14, and the rotation direction is a clockwise direction. In this case, the plurality of shooting locations determined by the upper-layer device sequentially include the camera 9, a camera 10, a camera 11, a camera 12, a camera 13, and the camera 14. Alternatively, when the surround playing request is used to request to perform static surround playing of the video content, the plurality of shooting locations determined by the upper-layer device may include some shooting locations from the start shooting location to the end shooting location in the rotation direction. For example, it is assumed that a union set of a shooting area of the camera 11 and a shooting area of the camera 13 in FIG. 3 completely covers a shooting area of the camera 12, the plurality of shooting locations determined by the upper-layer device may not include the shooting area of the camera 12. When static surround playing of video pictures collected by the camera 9 to the camera 14 is performed, because a video picture shot by the camera 11 and a video picture shot by the camera 13 include a video picture shot by the camera 12, a video picture does not change abruptly in a surround playing process, and it can be ensured that surround playing of the video picture is smooth.

Step 406: The upper-layer device generates a rotation fragment based on the rotation shooting location information and the playing time information.

The rotation fragment includes GOPs corresponding to the plurality of shooting locations in the rotation range. Optionally, the rotation fragment sequentially includes the GOPs corresponding to the plurality of shooting locations from the start shooting location to the end shooting location in the rotation direction.

In an optional embodiment, the surround playing request is used to request to perform dynamic surround playing of the video content, and each GOP in the rotation fragment includes one or more frames of video pictures. An implementation process of step 406 includes the following steps.

Step 4061A: The upper-layer device obtains m video fragments that correspond to each of the plurality of shooting locations and that are obtained from the playing start moment to the playing end moment, where m is a positive integer.

For example, it is assumed that the plurality of shooting locations sequentially include q shooting locations in the rotation direction, the playing start moment is T1, the playing end moment is T2, q is an integer greater than 0, T2>T1, and each video stream corresponding to each shooting location includes m video fragments in a time period (T1, T2). In this case, the upper-layer device separately obtains m video fragments corresponding to the q shooting locations in the time period (T1, T2).

Step 4062A: The upper-layer device extracts, based on the playing time information, one or more GOPs from the m video fragments corresponding to each shooting location.

Optionally, the upper-layer device determines, based on the surround playing duration and a quantity of the plurality of shooting locations, a quantity of extracted GOPs and a GOP extraction moment that correspond to each shooting location. The surround playing duration is equal to a difference between the playing end moment and the playing start moment. The upper-layer device extracts, based on the quantity of extracted GOPs and the GOP extraction moment that correspond to each shooting location, the GOP from the m video fragments corresponding to each shooting location.

Optionally, in two shooting locations arranged in the rotation direction, a GOP extraction moment corresponding to a previous shooting location is located, in a time sequence, before a GOP extraction moment corresponding to a current shooting location. The quantity of extracted GOPs corresponding to each shooting location is equal to a ratio of the surround playing duration to a product of a time length of the GOP and the quantity of the plurality of shooting locations (the ratio may be rounded up or rounded down).

For example, referring to the example in step 4061A, it is assumed that a time length of each GOP is t, and the quantity of extracted GOPs corresponding to each shooting location is equal to (T2−T1)/(q×t).

Step 4063A: The upper-layer device assembles extracted GOPs, to obtain the rotation fragment.

Optionally, the upper-layer device sequentially assembles the extracted GOPs in the rotation direction, to obtain the rotation fragment. The rotation fragment is a dynamic rotation fragment.

Figure 5:
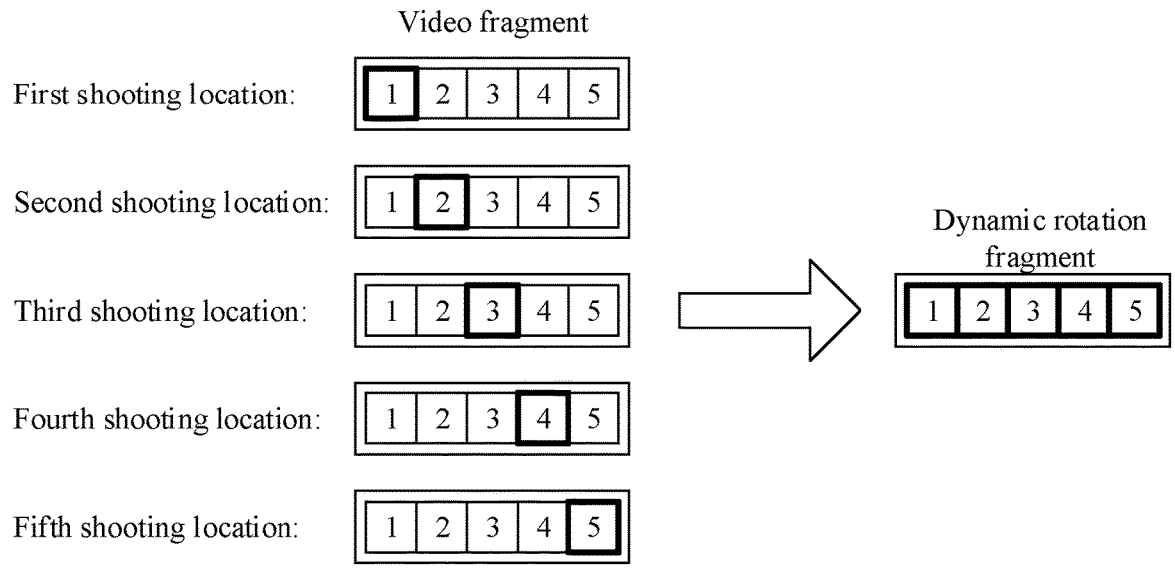
FIG. 5 is a schematic diagram of a rotation fragment generation process according to an embodiment.

For example, referring to the example in step 4061A, it is assumed that q=5, m=1, each video fragment includes five GOPs, and the quantity of extracted GOPs corresponding to each shooting location is 1. FIG. 5 is a schematic diagram of a rotation fragment generation process according to an embodiment. As shown in FIG. 5, GOPs in a video fragment corresponding to each shooting location are sequentially numbered 1 to 5, a GOP numbered 1 is extracted from a video fragment corresponding to a first shooting location, a GOP numbered 2 is extracted from a video fragment corresponding to a second shooting location, a GOP numbered 3 is extracted from a video fragment corresponding to a third shooting location, a GOP numbered 4 is extracted from a video fragment corresponding to a fourth shooting location, and a GOP numbered 5 is extracted from a video fragment corresponding to a fifth shooting location. The GOPs extracted from the video fragments corresponding to the five shooting locations are sequentially assembled in the rotation direction, to obtain the dynamic rotation fragment.

In another optional embodiment, the surround playing request is used to request to perform static surround playing of the video content, and each GOP in the rotation fragment includes one frame of video picture. An implementation process of step 406 includes the following steps.

Step 4061B: The upper-layer device obtains a target video fragment corresponding to each of the plurality of shooting locations, where a time period corresponding to the target video fragment includes the target playing moment.

That the time period corresponding to the target video fragment includes the target playing moment means that the target playing moment is located between a start moment and an end moment of the target video fragment.

Step 4062B: The upper-layer device extracts, from the target video fragment corresponding to each shooting location, one GOP corresponding to the target playing moment.

One GOP corresponding to the target playing moment means that a moment at which a video picture in the GOP is collected is the target playing moment.

Step 4063B: The upper-layer device assembles extracted GOPs, to obtain the rotation fragment.

Optionally, the upper-layer device sequentially assembles the extracted GOPs in the rotation direction, to obtain the rotation fragment. The rotation fragment is a static rotation fragment.

Figure 6:
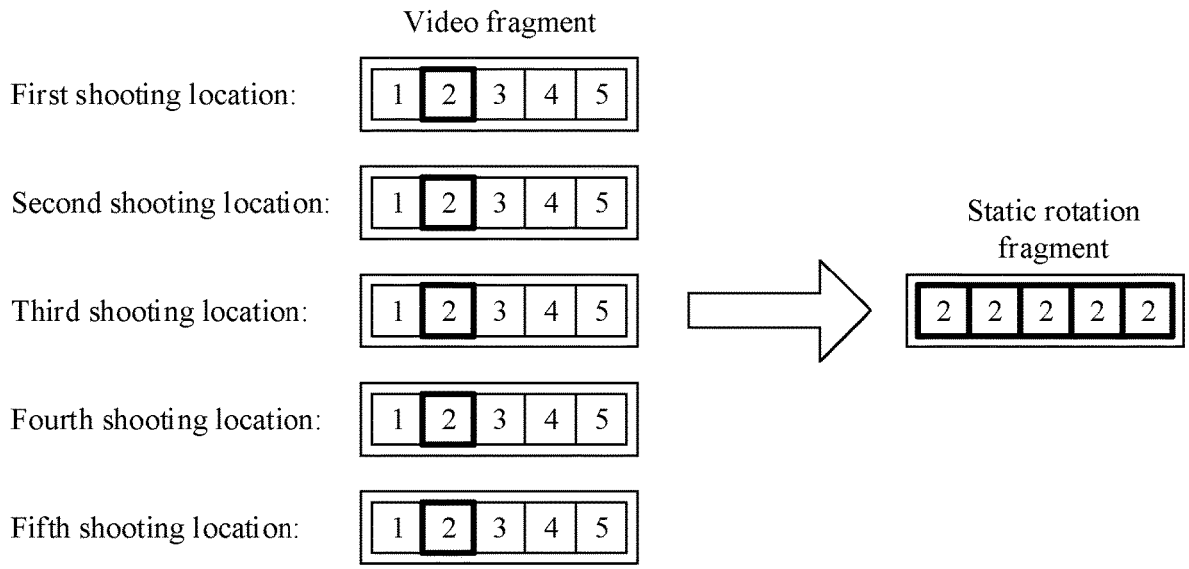
FIG. 6 is a schematic diagram of another rotation fragment generation process according to an embodiment.

For example, it is assumed that the quantity of the plurality of shooting locations is 5, and each video fragment includes five GOPs. FIG. 6 is a schematic diagram of another rotation fragment generation process according to an embodiment. As shown in FIG. 6, GOPs in a video fragment corresponding to each shooting location are sequentially numbered 1 to 5, and a GOP corresponding to the target playing moment is a GOP numbered 2. In this case, a GOP numbered 2 is extracted from each of the five shooting locations. The GOPs extracted from the video fragments corresponding to the five shooting locations are sequentially assembled in the rotation direction, to obtain the static rotation fragment.

Optionally, a quantity of GOPs included in the rotation fragment may be the same as or different from a quantity of GOPs included in another video fragment. For example, the quantity of GOPs included in the rotation fragment may be less than the quantity of GOPs included in the another video fragment. This is not limited in this embodiment.

Optionally, when the upper-layer device is a network device, after the upper-layer device receives the surround playing request, the upper-layer device first downloads the media content index from the video server, and parses the media content index, to obtain information about a video stream. The upper-layer device extracts, from the media content index, a URL address of a video stream corresponding to each of the plurality of shooting locations, and then separately obtains a corresponding video fragment based on the URL address of the video stream.

Step 407: The upper-layer device sends the rotation fragment to the terminal.

Optionally, when the surround playing request is used to request to perform dynamic surround playing of the video content, after the upper-layer device sends the rotation fragment to the terminal, the upper-layer device continues to send, to the terminal, a video stream corresponding to the end shooting location, so that the terminal can be smoothly switched from a played picture corresponding to the start shooting location to a played picture corresponding to the end shooting location. When the surround playing request is used to request to perform static surround playing of the video content, after the upper-layer device sends the rotation fragment to the terminal, the upper-layer device stops sending video data to the terminal.

Step 408: The terminal decodes and plays the rotation fragment.

The terminal decodes and plays the rotation fragment, to implement surrounding playing of video pictures corresponding to the plurality of shooting locations from the start shooting location to the end shooting location in the rotation direction. Resolution of a video picture played by the terminal may be the same as resolution of the video picture in the rotation fragment.

A sequence of the steps of the method embodiment provided in this embodiment can be appropriately adjusted, and the steps can also be correspondingly added or deleted based on a situation. Any method that can be readily figured out by a person skilled in the art within the technical scope disclosed shall fall within the protection scope of this disclosure. Therefore, details are not described again.

In conclusion, in the video playing method provided in this embodiment, the upper-layer device determines the playing time information based on the surround playing request sent by the terminal, and then generates the rotation fragment based on the playing time information and the rotation shooting location information in the surround playing request. Because the rotation fragment includes the GOPs corresponding to the plurality of shooting locations in the rotation range indicated by the rotation shooting location information, after the terminal receives the rotation fragment, the terminal decodes the rotation fragment, so that surround playing of the video picture can be implemented, and the resolution of the played video picture can be the same as the resolution of the video picture in the rotation fragment. Therefore, the video playing method provided in this embodiment is not limited by a quantity of cameras used for front-end shooting, and is widely applied. In addition, the upper-layer device may be a video distribution server or a network device, to reduce a requirement for processing performance of a video processing server. There is high implementation reliability.

Figure 7:
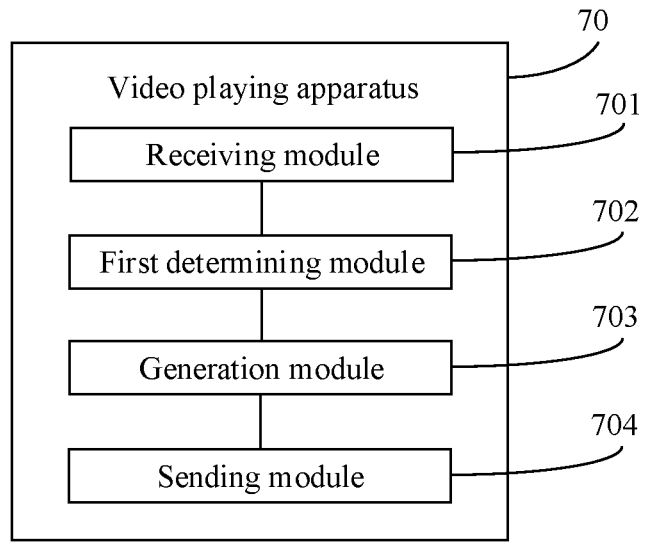
FIG. 7 is a schematic diagram of a structure of a video playing apparatus according to an embodiment.

FIG. 7 is a schematic diagram of a structure of a video playing apparatus according to an embodiment. The apparatus is applied to an upper-layer device. For example, the upper-layer device may be a video server or a network device in the video playing system shown in FIG. 1. As shown in FIG. 7, the apparatus 70 includes: a receiving module 701 configured to receive a surround playing request sent by a terminal, where the surround playing request includes rotation shooting location information, and the rotation shooting location information is used to indicate a rotation range; a first determining module 702 configured to determine playing time information based on the surround playing request; a generation module 703 configured to generate a rotation fragment based on the rotation shooting location information and the playing time information, where the rotation fragment includes groups of pictures GOPs corresponding to a plurality of shooting locations in the rotation range, and the GOP includes one or more frames of video pictures; and a sending module 704 configured to send the rotation fragment to the terminal.

Optionally, the playing time information includes a playing start moment and a playing end moment, and the generation module 703 is configured to: obtain m video fragments that correspond to each of the plurality of shooting locations and that are obtained from the playing start moment to the playing end moment, where m is a positive integer; extract, based on the playing time information, one or more GOPs from the m video fragments corresponding to each shooting location; and assemble extracted GOPs, to obtain the rotation fragment.

Optionally, the generation module 703 is further configured to: determine, based on surround playing duration and a quantity of the plurality of shooting locations, a quantity of extracted GOPs and a GOP extraction moment that correspond to each shooting location, where the surround playing duration is equal to a difference between the playing end moment and the playing start moment; and extract, based on the quantity of extracted GOPs and the GOP extraction moment that correspond to each shooting location, the GOP from the m video fragments corresponding to each shooting location.

Optionally, the playing time information includes a target playing moment, and the generation module 703 is configured to: obtain a target video fragment corresponding to each of the plurality of shooting locations, where a time period corresponding to the target video fragment includes the target playing moment; extract, from the target video fragment corresponding to each shooting location, one GOP corresponding to the target playing moment, where the GOP includes one frame of video picture; and assemble extracted GOPs, to obtain the rotation fragment.

Figure 8:
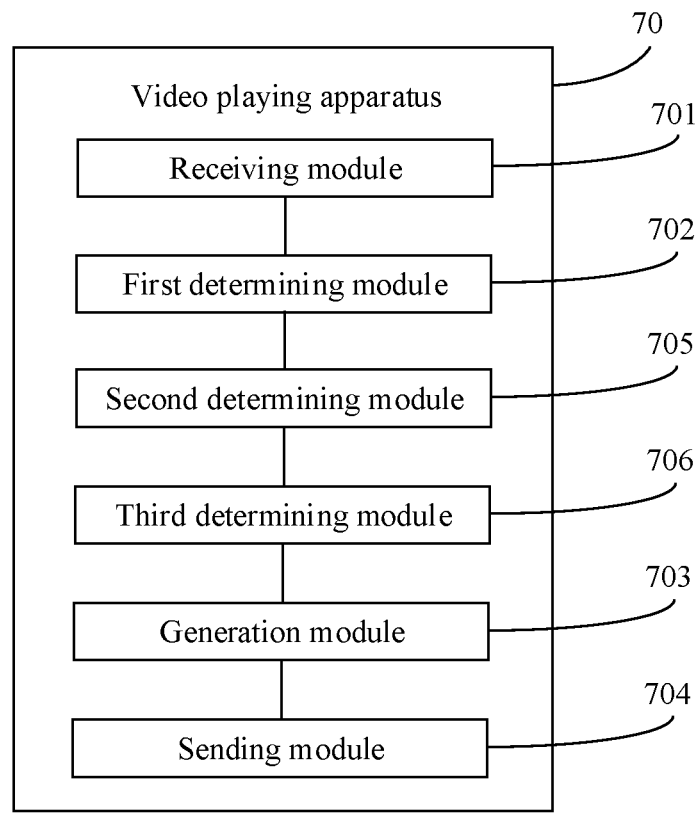
FIG. 8 is a schematic diagram of a structure of another video playing apparatus according to an embodiment.

Optionally, as shown in FIG. 8, the apparatus 70 further includes: a second determining module 705 configured to determine a start shooting location, an end shooting location, and a rotation direction based on the rotation shooting location information; and a third determining module 706 configured to determine the plurality of shooting locations from shooting locations from the start shooting location to the end shooting location in the rotation direction.

The generation module 703 is configured to sequentially assemble the extracted GOPs in the rotation direction, to obtain the rotation fragment.

Optionally, the first determining module 702 is configured to determine the playing start moment and the playing end moment based on a moment at which the surround playing request is received and a preset policy, where the preset policy includes preset surround playing duration; or the surround playing request includes the playing start moment and the playing end moment, and the first determining module 702 is configured to identify the playing start moment and the playing end moment from the surround playing request; or the surround playing request includes the playing start moment, and the first determining module 702 is configured to determine the playing end moment based on the playing start moment and preset surround playing duration; or the surround playing request includes the surround playing duration, and the first determining module 702 is configured to determine the playing start moment and the playing end moment based on a moment at which the surround playing request is received and the surround playing duration; or the surround playing request includes the playing start moment and the surround playing duration, and the first determining module 702 is configured to determine the playing end moment based on the playing start moment and the surround playing duration.

Optionally, the GOP is encoded in an encapsulation manner for independent transmission.

In conclusion, in the video playing apparatus provided in this embodiment, the upper-layer device determines, by using the first determining module, the playing time information based on the surround playing request sent by the terminal, and then generates, by using the generation module, the rotation fragment based on the playing time information and the rotation shooting location information in the surround playing request. Because the rotation fragment includes the GOPs corresponding to the plurality of shooting locations in the rotation range indicated by the rotation shooting location information, after the terminal receives the rotation fragment, the terminal decodes the rotation fragment, so that surround playing of the video picture can be implemented, and resolution of a played video picture can be the same as resolution of the video picture in the rotation fragment. Therefore, the video playing apparatus provided in this embodiment is not limited by a quantity of cameras used for front-end shooting, and is widely applied. In addition, the upper-layer device may be a video distribution server or a network device, to reduce a requirement for processing performance of a video processing server. There is high implementation reliability.

Figure 9:
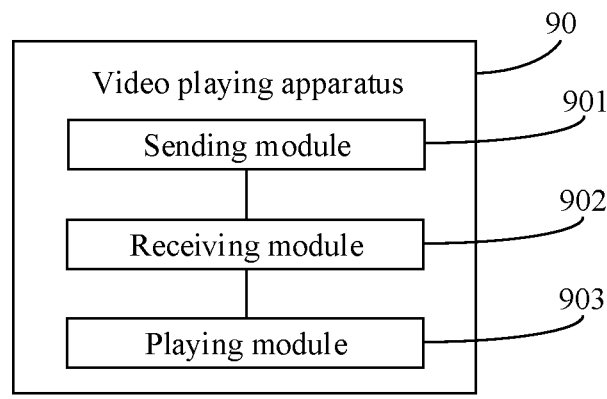
FIG. 9 is a schematic diagram of a structure of still another video playing apparatus according to an embodiment.

FIG. 9 is a schematic diagram of a structure of still another video playing apparatus according to an embodiment. The apparatus is applied to a terminal. For example, the apparatus may be the terminal 103 in the video playing system shown in FIG. 1. As shown in FIG. 9, the apparatus 90 includes: a sending module 901 configured to: when a terminal receives a rotation instruction, send, to an upper-layer device, a surround playing request generated based on the rotation instruction, where the surround playing request includes rotation shooting location information, and the rotation shooting location information is used to indicate a rotation range; a receiving module 902 configured to receive a rotation fragment sent by the upper-layer device, where the rotation fragment includes groups of pictures GOPs corresponding to a plurality of shooting locations in the rotation range, and the GOP includes one or more frames of video pictures; and a playing module 903 configured to decode and play the rotation fragment.

Figure 10:
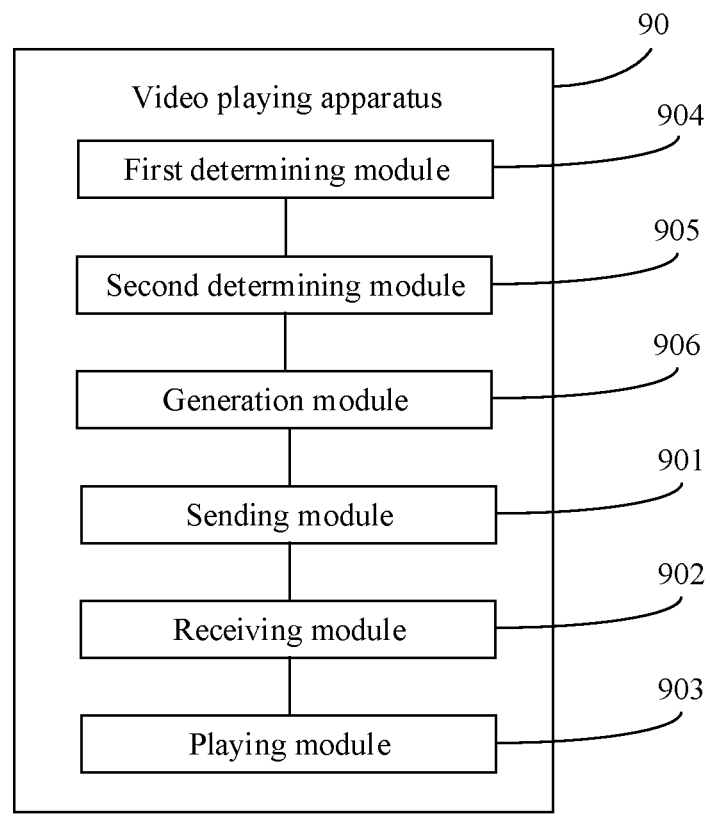
FIG. 10 is a schematic diagram of a structure of yet another video playing apparatus according to an embodiment.

Optionally, as shown in FIG. 10, the apparatus 90 further includes: a first determining module 904 configured to: when the terminal detects a sliding operation in a video playing interface, determine that the rotation instruction is received; a second determining module 905 configured to determine the rotation shooting location information based on sliding information of the sliding operation, where the sliding information includes one or more of a sliding start location, a sliding length, a sliding direction, or a sliding angle; and a generation module 906 configured to generate the surround playing request based on the rotation shooting location information.

Figure 11:
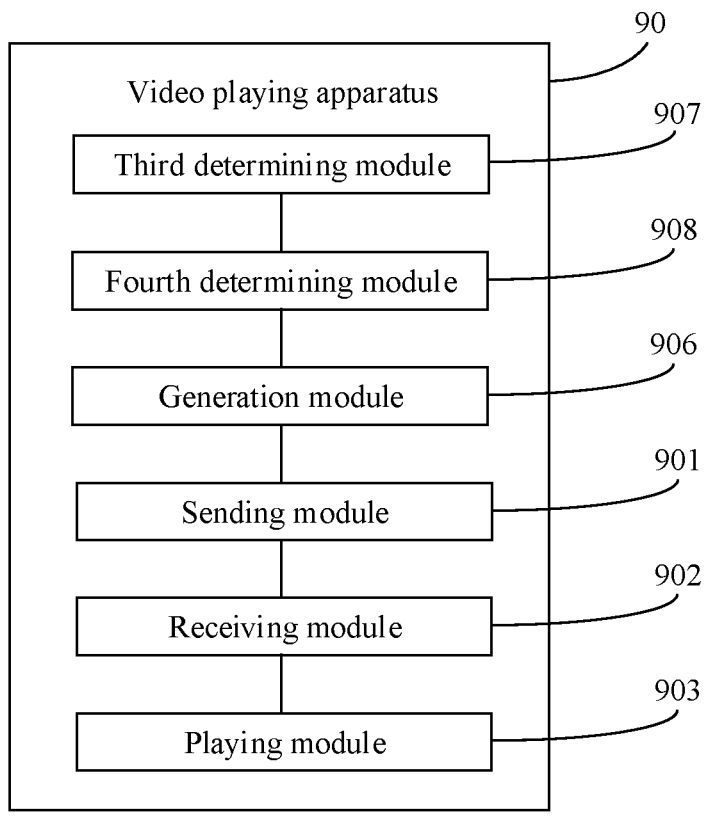
FIG. 11 is a schematic diagram of a structure of still yet another video playing apparatus according to an embodiment.

Optionally, as shown in FIG. 11, the apparatus 90 further includes: a third determining module 907 configured to: when the terminal receives a target remote control instruction sent by a remote control device, determine that the rotation instruction is received, where the target remote control instruction includes remote control button information, and the remote control button information includes a button identifier and/or a quantity of times of pressing a button; and a fourth determining module 908 configured to determine the rotation shooting location information based on the remote control button information.

The generation module 906 is configured to generate the surround playing request based on the rotation shooting location information.

In conclusion, in the video playing apparatus provided in this embodiment, after receiving the rotation instruction, the terminal sends the surround playing request to the upper-layer device by using the sending module, and then receives, by using the receiving module, the rotation fragment sent by the upper-layer device. Because the rotation fragment includes the GOPs corresponding to the plurality of shooting locations in the rotation range indicated by the rotation shooting location information, after the terminal receives the rotation fragment, the terminal decodes the rotation fragment by using the playing module, so that surround playing of the video picture can be implemented, and resolution of a played video picture can be the same as resolution of the video picture in the rotation fragment. Therefore, a video playing method provided in this embodiment is not limited by a quantity of cameras used for front-end shooting, and is widely applied. In addition, the upper-layer device may be a video distribution server or a network device, to reduce a requirement for processing performance of a video processing server. There is high implementation reliability.

For the apparatus in the foregoing embodiment, a specific manner of executing an operation by each module is described in detail in a related method embodiment, and details are not described herein.

An embodiment further provides a video playing system. The system includes an upper-layer device and a terminal. The upper-layer device includes the video playing apparatus shown in FIG. 7 or FIG. 8, and the terminal includes the video playing apparatus shown in any one of FIG. 9 to FIG. 11.

Figure 12:
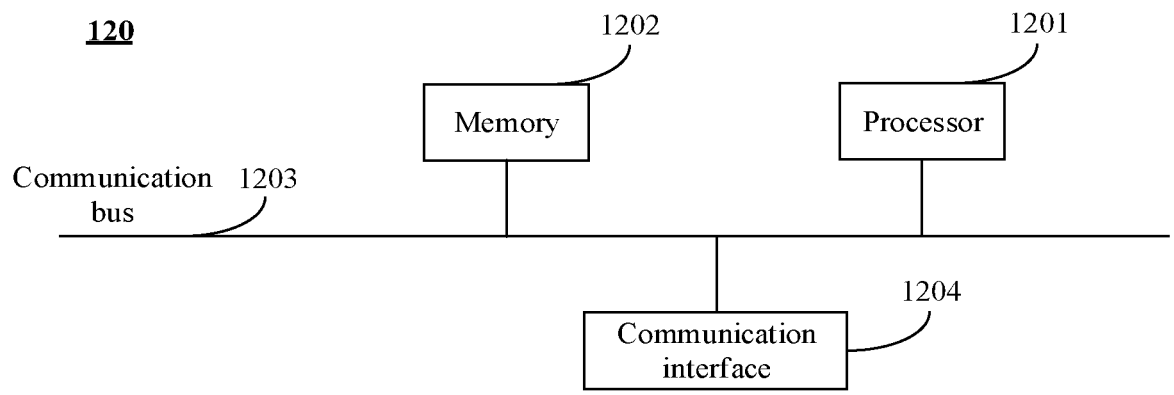
FIG. 12 is a block diagram of a video playing apparatus according to an embodiment.

FIG. 12 is a block diagram of a video playing apparatus according to an embodiment. The video playing apparatus may be an upper-layer device or a terminal, the upper-layer device may be a video server or a network device, and the terminal may be a mobile phone, a tablet computer, an intelligent wearable device, a set top box, or the like. As shown in FIG. 12, the video playing apparatus 120 includes a processor 1201 and a memory 1202.

The memory 1202 is configured to store a computer program, where the computer program includes program instructions.

The processor 1201 is configured to invoke the computer program, to implement an action performed by an upper-layer device or an action performed by a terminal in the video playing method shown in FIG. 4.

Optionally, the video playing apparatus 120 further includes a communication bus 1203 and a communication interface 1204.

The processor 1201 includes one or more processing cores, and the processor 1201 executes various functional applications and performs data processing by running the computer program.

The memory 1202 may be configured to store the computer program. Optionally, the memory may store an operating system and an application program unit that may be required by at least one function. The operating system may be an operating system such as a real time operating system like RTX, LINUX, UNIX, WINDOWS, or OS X.

There may be a plurality of communication interfaces 1204. The communication interfaces 1204 are configured to communicate with another storage device or a network device. For example, a communication interface of the upper-layer device may be configured to send a rotation fragment to the terminal, and a communication interface of the terminal may be configured to send a surround playing request to the upper-layer device. The network device may be a switch, a router, or the like.

The memory 1202 and the communication interface 1204 are separately connected to the processor 1201 through the communication bus 1203.

An embodiment further provides a computer storage medium. The computer storage medium stores instructions. When the instructions are executed by a processor of a computer device, an action performed by an upper-layer device or an action performed by a terminal in the video playing method in the foregoing method embodiment is implemented.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, a compact disc, or the like.

In embodiments, the terms "first", "second", and "third" are merely used for a purpose of description, and shall not be understood as an indication or implication of relative importance.

The term "and/or" describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are merely optional embodiments, but are not intended to limit this disclosure. Any modification, equivalent replacement, improvement, or the like made without departing from the concept and principle of this disclosure should fall within the protection scope of this disclosure.

What is claimed is:

1. A method implemented by an upper-layer device and comprising:
   generating a media content index comprising video stream information of a plurality of video streams, wherein the video stream information comprises shooting location information, wherein the shooting location information comprises a quantity of shooting locations and a shooting location angle corresponding to each video stream of the plurality of video streams;
   sending, to a terminal, the media content index;
   receiving, from the terminal, a surround playing request comprising rotation shooting location information, wherein the rotation shooting location information is based on the shooting location information and indicates a start shooting location and a rotation range, wherein when the terminal is in a video playing state, the surround playing request further comprises one or more of a playing start moment, a playing end moment, or a surround playing duration, and wherein when the terminal is in a video paused state, the surround playing request further comprises a target playing moment and one or more of the playing start moment, the playing end moment, or the surround playing duration;
   generating, based on the rotation shooting location information and playing time information, a rotation fragment comprising a group of pictures (GOP) corresponding to shooting locations in the rotation range, wherein the GOP comprises one or more frames of video pictures, and wherein the playing time information is based on the surround playing request; and
   sending the rotation fragment to the terminal.

2. The method of claim 1, wherein the playing time information comprises the playing start moment and the playing end moment, and wherein generating the rotation fragment comprises:
   obtaining m video fragments that correspond to each of the shooting locations and that are from the playing start moment to the playing end moment, wherein m is a positive integer;

extracting, based on the playing time information, one or more GOPs from the m video fragments; and assembling the one or more GOPs to obtain the rotation fragment.

3. The method of claim 2, further comprising further extracting, based on a second quantity of the one or more GOPs and a GOP extraction moment that correspond to each of the shooting locations, the one or more GOPs, wherein the second quantity of the one or more GOPs and the GOP extraction moment is based on the surround playing duration and a first quantity of the shooting locations, and wherein the surround playing duration is equal to a difference between the playing end moment and the playing start moment.

4. The method of claim 2, wherein the start shooting location, an end shooting location, and a rotation direction are based on the rotation shooting location information, and wherein the method further comprises:

selecting the shooting locations from the start shooting location to the end shooting location in the rotation direction; and further assembling the GOPs in a sequential manner.

5. The method of claim 2, wherein:

the playing start moment and the playing end moment are based on a first moment at which the surround playing request is received and based on a preset policy, wherein the preset policy comprises a preset surround playing duration;

the surround playing request comprises the playing start moment and the playing end moment, wherein the playing time information is based on the playing start moment and the playing end moment from the surround playing request;

the surround playing request comprises the playing start moment, wherein the playing end moment is based on the playing start moment and the preset surround playing duration;

the surround playing request comprises the surround playing duration, wherein the playing start moment and the playing end moment are based on the first moment and the surround playing duration; or the surround playing request comprises the playing start moment and the surround playing duration, wherein the playing end moment is based on the playing start moment and the surround playing duration.

6. The method of claim 1, wherein the playing time information comprises the target playing moment, and wherein generating the rotation fragment comprises:

obtaining target video fragments corresponding to the shooting locations;

extracting GOPs from the target video fragments, wherein each of the GOPs comprises one frame of a video picture; and assembling the GOPs to obtain the rotation fragment.

7. The method of claim 1, further comprising encoding the GOP in an encapsulation manner for independent transmission.

8. A method implemented by a terminal and comprising:

receiving, from an upper-layer device, a media content index comprising video stream information of a plurality of video streams, wherein the video stream information comprises shooting location information, wherein the shooting location information comprises a quantity of shooting locations and a shooting location angle corresponding to each video stream of the plurality of video streams;

receiving a rotation instruction;

generating a surround playing request comprising rotation shooting location information indicating a start shooting location and a rotation range, wherein the start shooting location and the rotation range are based on the rotation instruction and the shooting location information, wherein when the terminal is in a video playing state, the surround playing request further comprises one or more of a playing start moment, a playing end moment, or a surround playing duration, and wherein when the terminal is in a video paused state, the surround playing request further comprises a target playing moment and one or more of the playing start moment, the playing end moment, or the surround playing duration;

sending, to the upper-layer device, the surround playing request;

receiving, from the upper-layer device, a rotation fragment comprising a group of pictures (GOP) corresponding to shooting locations in the rotation range, wherein the GOP comprises one or more frames of video pictures;

decoding the rotation fragment to obtain a decoded rotation fragment; and playing the decoded rotation fragment.

9. The method of claim 8, further comprising:

detecting a sliding operation in a video playing interface, wherein the sliding operation is the rotation instruction, wherein the rotation shooting location information is based on sliding information of the sliding operation, and wherein the sliding information comprises a sliding start location, a sliding length, a sliding direction, or a sliding angle; and generating the surround playing request based on the rotation shooting location information.

10. The method of claim 8, further comprising:

receiving a target remote control instruction from a remote control device, wherein the target remote control instruction is the rotation instruction, wherein the target remote control instruction comprises remote control button information, wherein the remote control button information comprises a button identifier or a quantity of times of pressing a button, and wherein the rotation shooting location information is based on the remote control button information; and generating the surround playing request based on the rotation shooting location information.

11. An apparatus implemented in an upper-layer device and comprising:

a receiver configured to receive, from a terminal, a surround playing request comprising rotation shooting location information, wherein the rotation shooting location information is based on shooting location information and indicates a start shooting location and a rotation range, wherein when the terminal is in a video playing state, the surround playing request further comprises one or more of a playing start moment, a playing end moment, or a surround playing duration, and wherein when the terminal is in a video paused state, the surround playing request further comprises a target playing moment and one or more of the playing start moment, the playing end moment, or the surround playing duration;

a processor coupled to the receiver and configured to:

generate a media content index comprising video stream information of a plurality of video streams, wherein the video stream information comprises the shooting location information, wherein the shooting location information comprises a quantity of shooting locations and a shooting location angle corresponding to each video stream of the plurality of video streams; and generate, based on the rotation shooting location information and playing time information, a rotation fragment comprising a group of pictures (GOP) corresponding to shooting locations in the rotation range, wherein the GOP comprises one or more frames of video pictures, and wherein the playing time information is based on the surround playing request; and a transmitter coupled to the processor and configured to:
send the media content index to the terminal; and
send the rotation fragment to the terminal.

12. The apparatus of claim 11, wherein the playing time information comprises the playing start moment and the playing end moment, and wherein the processor is further configured to generate the rotation fragment by:
obtaining m video fragments that correspond to each of the shooting locations and that are from the playing start moment to the playing end moment, wherein m is a positive integer;
extracting, based on the playing time information, one or more GOPs from the m video fragments; and
assembling the one or more GOPs to obtain the rotation fragment.

13. The apparatus of claim 12, wherein the processor is further configured to further extract, based on a second quantity of the one or more GOPs and a GOP extraction moment that correspond to each of the shooting locations, the one or more GOPs, wherein the second quantity of the one or more GOPs and the GOP extraction moment is based on the surround playing duration and a first quantity of the shooting locations, and wherein the surround playing duration is equal to a difference between the playing end moment and the playing start moment.

14. The apparatus of claim 12, wherein the start shooting location, an end shooting location, and a rotation direction are based on the rotation shooting location information, and wherein the processor is further configured to:
select the shooting locations from the start shooting location to the end shooting location in the rotation direction; and
further assemble the GOPs in a sequential manner.

15. The apparatus of claim 12, wherein:
the playing start moment and the playing end moment are based on a first moment at which the surround playing request is received and based on a preset policy, wherein the preset policy comprises a preset surround playing duration;
the surround playing request comprises the playing start moment and the playing end moment, wherein the playing time information is based on the playing start moment and the playing end moment from the surround playing request;
the surround playing request comprises the playing start moment, wherein the playing end moment is based on the playing start moment and the preset surround playing duration;
the surround playing request comprises the surround playing duration, wherein the playing start moment and the playing end moment are based on the first moment and the surround playing duration; or
the surround playing request comprises the playing start moment and the surround playing duration, wherein the playing end moment is based on the playing start moment and the surround playing duration.

16. The apparatus of claim 11, wherein the playing time information comprises the target playing moment, and wherein the processor is further configured to generate the rotation fragment by:
obtaining target video fragments corresponding to the shooting locations;
extracting GOPs from the target video fragments, wherein each of the GOPs comprises one frame of a video picture; and
assembling the GOPs to obtain the rotation fragment.

17. The apparatus of claim 11, wherein the processor is further configured to encode the GOP in an encapsulation manner for independent transmission.

18. An apparatus implemented in a terminal and comprising:
a receiver configured to:
receive, from an upper-layer device, a media content index comprising video stream information of a plurality of video streams, wherein the video stream information comprises shooting location information, wherein the shooting location information comprises a quantity of shooting locations and a shooting location angle corresponding to each video stream of the plurality of video streams; and
receive a rotation instruction;
a processor coupled to the receiver and configured to generate a surround playing request comprising rotation shooting location information indicating a start shooting location and a rotation range, wherein the start shooting location and the rotation range are based on the rotation instruction and the shooting location information, wherein when the terminal is in a video playing state, the surround playing request further comprises one or more of a playing start moment, a playing end moment, or a surround playing duration, and wherein when the terminal is in a video paused state, the surround playing request further comprises a target playing moment and one or more of the playing start moment, the playing end moment, or the surround playing duration;
a transmitter coupled to the processor and configured to send, to the upper-layer device, the surround playing request;
wherein the receiver is further configured to receive, from the upper-layer device, a rotation fragment comprising a group of pictures (GOP) corresponding to shooting locations in the rotation range, wherein the GOP comprises one or more frames of video pictures; and
wherein the processor is further configured to:
decode the rotation fragment to obtain a decoded rotation fragment; and
play the decoded rotation fragment.

19. The apparatus of claim 18, wherein the apparatus further comprises a video playing interface configured to detect a sliding operation, wherein the sliding operation is the rotation instruction, wherein the rotation shooting location information is based on sliding information of the sliding operation, wherein the sliding information comprises a sliding start location, a sliding length, a sliding direction, or a sliding angle, and
wherein the processor is further configured to generate the surround playing request based on the rotation shooting location information.

20. The apparatus of claim 18, wherein the processor is further configured to:

receive a target remote control instruction from a remote control device, wherein the target remote control instruction is the rotation instruction, wherein the target remote control instruction comprises remote control button information, wherein the remote control button information comprises a button identifier or a quantity of times of pressing a button, and wherein the rotation shooting location information is based on the remote control button information; and generate the surround playing request based on the rotation shooting location information.

\* \* \* \* \*